G. H. BRUCE.
SUBSTITUTE FOR LEATHER AND METHOD FOR MAKING SAME.
APPLICATION FILED NOV. 1, 1917.

1,279,242. Patented Sept. 17, 1918.

Fiber
Glue
Vulcanized composite sheet containing rubber or gum or both and cotton-fiber Inventor
George H. Bruce.
By Percy H. Moore
Attorney.

UNITED STATES PATENT OFFICE.

GEORGE H. BRUCE, OF NEW YORK, N. Y.

SUBSTITUTE FOR LEATHER AND METHOD FOR MAKING SAME.

1,279,242.  Specification of Letters Patent.  Patented Sept. 17, 1918.

Application filed November 1, 1917. Serial No. 199,708.

*To all whom it may concern:*

Be it known that I, GEORGE H. BRUCE, a citizen of the United States of America, residing at New York, in the county of New York and State of New York, have invented certain new and useful Improvements in Substitutes for Leather and Methods for Making Same, of which the following is a specification.

This invention relates to a substitute for shoe sole and the method of making same.

Heretofore various substitutes for shoe sole leather have been made principally from rubber or gum, or both intermixed while in a plastic state with cotton or other fiber and generally a mineral filler, the latter being used for its wearing qualities. After the mixing operation the material is first run through a grinding and pressing mill and then through a cullendering machine. The resultant sheets are then placed in a suitable press where they are subjected to a thorough vulcanization.

The foregoing product because of its waterproof and wearing qualities has proven to be a valuable substitute for sole leather to makers of sport and other flat-soled shoes, the soles of which need merely be cut from a sheet of material and sewed in place. It has been found impossible however, to shape or arch this material as in the manufacture of high-class shoes for women. In making such shoes from ordinary leather sole the latter is moistened and then placed in a mold until dry. When removed from the mold the leather sole will retain its shape but this result cannot be obtained from the use of the substitute product because its rubber content will not hold moisture and therefore will not mold. Furthermore if subjected to a further vulcanization in a heated mold the substitute material will crack.

I have discovered that the hereinbefore mentioned difficulties can be obviated in the following manner:

I intimately apply a strong fiber sheet preferably paper fiber or card board to one face of the substitute soling material. The laminated sheet thus produced after being cut to sole size is placed in a mold to give the finished sole the desired arch or curvature for use in high-heeled shoes and the like. The fiber facing or backing sheet, as the case may be thus shaped or arched will cause the soling material to conform to and retain its shape after removal from the mold. In some instances the soling material after vulcanization and the fiber sheet may be buffed on their contiguous faces and secured together by an adhesive substance, the whole then being placed under pressure in a suitable vulcanizing press. The application of heat and pressure cements or binds the sheets intimately together. The preferred method however, is to attach the fiber sheet by means of a suitable adhesive to the soling material as the latter comes from the cullender and before curing or vulcanization of the latter. The laminated structure is then placed in a vulcanizing press where by the application of heat and pressure a homogeneous sheet capable of being molded into the desired shape is formed, it being understood that when heated the soling material becomes soft and sticky. By gaging the thickness and strength of the fiber sheet according to the thickness of the soling material which it is to carry no difficulty will be experienced in the shaping operation.

In the accompanying drawing—

Figure 1:
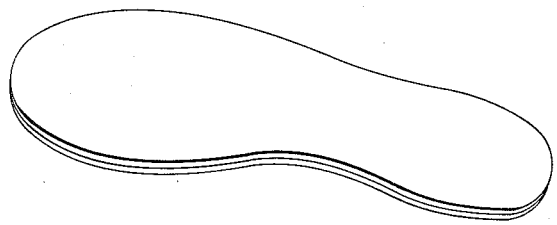
Figure 1 is a perspective view of a shoe-sole embodying my invention.
Figure 2:
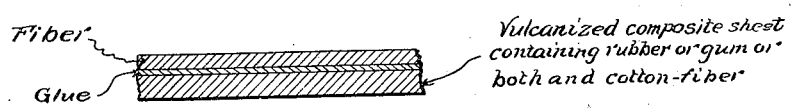
Fig. 2 is a fragmental view thereof on an enlarged scale, suitably labeled, disclosing the constituent characteristics or features of the same.

In carrying out the shaping operation the fiber sheet may be moistened before placing the sheet together with the soling material in the mold as is customary when shaping ordinary leather soles or the moistening operation may be dispensed with. I have found in actual practice that the fiber sheet will when taken from the mold hold its shape and likewise carry the soling material even though placed in the mold when perfectly dry.

There are many obvious uses to which my invention may be put and consequently I do not wish to be understood as restricting its use to the manufacture of shoe soles.

Having thus described my invention, what I claim is:

1. As an article of manufacture, a composite-sheet containing rubber or gum or both and cotton fiber, said composite sheet having intimately secured thereto a fiber-sheet, said composite and fiber sheets being molded into arched shape; said fiber sheet being of an integrity which will maintain it, together with the composite sheet, in permanently molded arched form.

2. As an article of manufacture, a vulcanized composite sheet containing rubber or gum or both, and cotton-fiber, and a sheet of fiber superposed upon and glued to said first mentioned sheet said composite and fiber sheets being molded into arched shape, said fiber sheet being of an integrity which will maintain it, together with the composite sheet, in permanently molded arched form.

3. The herein described method of making a substitute for leather consisting in mixing together rubber and fiber, grinding the mixture and forming it into sheet form, vulcanizing the sheet, and adhering a sheet of arch forming capacity or integrity to one face thereof.

In testimony whereof I affix my signature in presence of two witnesses.

GEORGE H. BRUCE.

Witnesses:
RONALD K. BROWN,
VICTOR GERBER.